United States Patent

[11] 3,627,907

[72] Inventors Hans Diggelmann
Muri;
Rudolf Kuhne, Berne, both of Switzerland
[21] Appl. No. 875,172
[22] Filed Oct. 10, 1969
[45] Patented Dec. 14, 1971
[73] Assignee Hasler AG
Berne, Switzerland
[32] Priority Nov. 15, 1968
[33] Switzerland
[31] 16980/68

[54] BINARY PULSE TRAIN TRANSMISSION SYSTEMS
3 Claims, 5 Drawing Figs.

[52] U.S. Cl. .... 178/2 B
[51] Int. Cl. .... H04l 17/00
[50] Field of Search .... 178/2 B, 26 A; 340/347 DD

[56] References Cited

UNITED STATES PATENTS

| | | | |
|---|---|---|---|
| 2,700,696 | 1/1955 | Barker .... | 178/2 B |
| 3,154,777 | 10/1964 | Thomas .... | 340/347 DD |

*Primary Examiner*—Kathleen H. Claffy
*Assistant Examiner*—Douglas W. Olms
*Attorney*—Brady, O'Boyle & Gates ABSTRACT: A system for the transmission by a transmitter of a first synchronous binary pulse train having means for converting said pulse train into a second synchronous pulse train and having means for transmitting said second pulse train to a receiver adapted to receive said second pulse train and to convert it into a pulse train corresponding to the first mentioned pulse train.

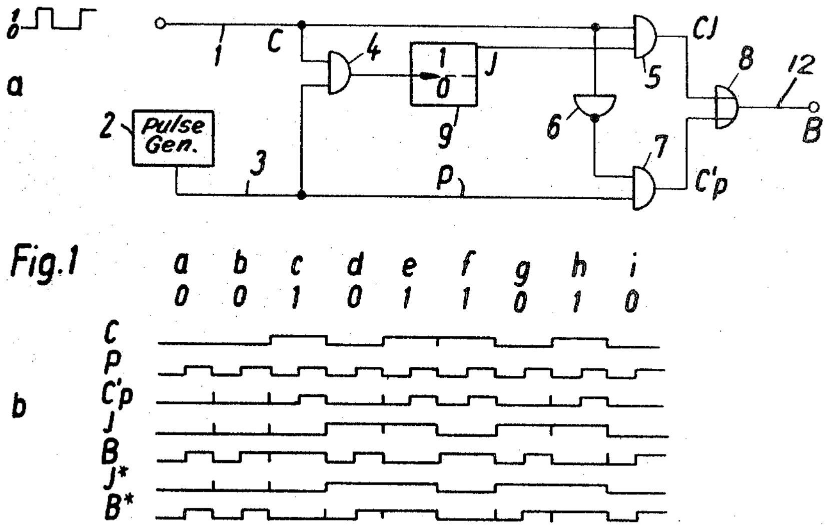
Fig.1
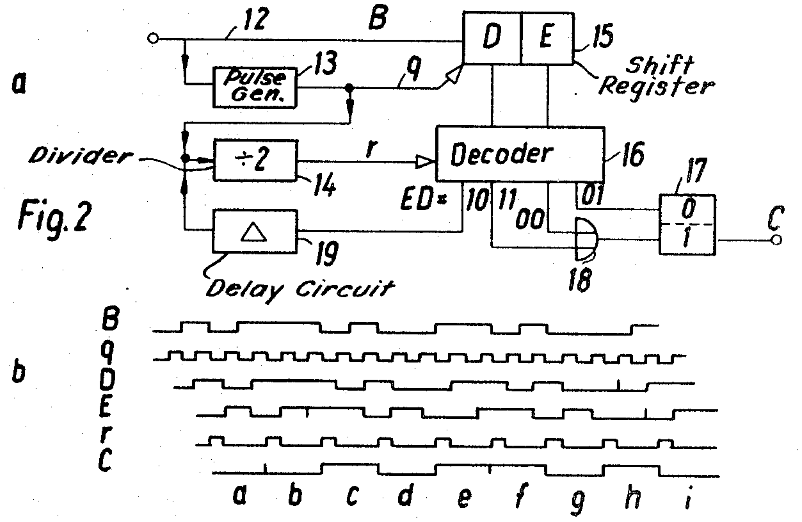
Fig.2
Fig.3
| Binär | A-Code | B-Code |
|---|---|---|
| C | A1 A2 | B1 B2 |
| 0 | 01 | 01 |
| 1 | 00 | 00 11 |
a
| Binär | A-Code | | | | | |
|---|---|---|---|---|---|---|
| TSR WVU | A1 | A2 | A1 N | A2 M | A1 L | A2 K |
| 000 | 1 | 0 | 0 | 1 | 0 | 1 |
| 001 | 1 | 0 | 0 | 1 | 0 | 0 |
| 010 | 1 | 0 | 0 | 1 | 1 | 0 |
| 011 | 1 | 0 | 0 | 0 | 0 | 1 |
| 100 | 1 | 0 | 0 | 0 | 0 | 0 |
| 101 | 1 | 0 | 0 | 0 | 1 | 0 |
| 110 | 1 | 0 | 1 | 0 | 0 | 1 |
| 111 | 1 | 0 | 1 | 0 | 0 | 0 |
b
Inventors
HANS DIGGELMANN
RUDOLF KUHNE
BY Brady, O'Boyle & Gates
ATTORNEYS

BINARY PULSE TRAIN TRANSMISSION SYSTEMS

The invention relates to a system for transmission of a first, synchronous binary pulse train by a transmitter, having means for converting the given pulse train into a second, synchronous pulse train with a mean DC value of 0 and having means for transmitting said pulse train, via transmitting means with downwardly limited bandwidth, to a receiver which receives the second pulse train and converts it into a pulse train corresponding to the first pulse train.

A binary pulse train is described as being synchronous if each of the pulses of equal duration and position is disposed in one time element and if said time elements are of constant duration and succeed each other without interruption.

It is known, for the purpose of transmission, to convert such pulse trains into other pulse trains which are more suitable for the given transmission system than the original pulse train. It is in particular desirable in transmission over lines for the pulse train to have a mean DC value 0 and that a sufficient number of character changes take place within a given period of time; these conditions greatly simplify the construction of repeaters along the transmission line.

Figure 4:
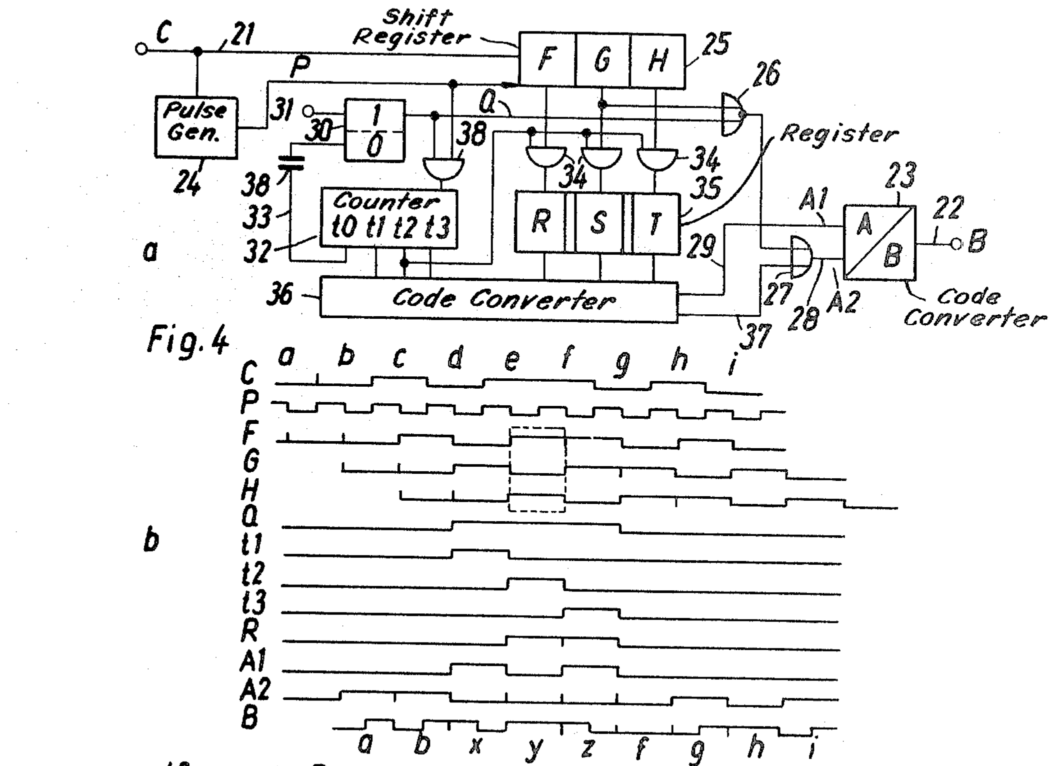

The prior art furthermore discloses a system for the binary encoding of a train of ternary elements so that the difference in the number of binary zeros and ones in a text of any desired length does not exceed the FIG. 4 (W. Neu, "Some Techniques of Pulse Code Modulation," Bulletin des Schweizerischen Elektrotechnischen Vereins, Vol. 51 (1960), pages 978–980).

In this system, the ternary number 0 is transmitted by the bit pair 0 1, the ternary number 1 being alternately transmitted by the bit pair 0 0 or 1 1 and the ternary number 2 being transmitted by the bit pair 1 0 According to Neu the transmission code is referred to as the B-code. It is obtained from the ternary code in that initially 0 is converted into 0 1, 1 is converted into 0 0, 2 is converted into 1 0, resulting in the so-called A-code. In a further step each second 0 0 0 is converted into 1 1 so that the B-code is obtained.

The invention employs the B-code for transmitting a binary pulse train, the redundance existing under these conditions enabling a wrong formation of pairs to be detected in the receiver and in which, in a further embodiment of the invention, it is possible to transmit via the transmission channel service signals without interrupting the synchronism existing between the transmitted second pulse train and the first synchronous pulse train. The invention is characterized by means which are provided in the transmitter for converting each bit of the first pulse train into two successive bits of a second, binary pulse train of twice the bit frequency, so that one value of one bit of the first pulse train corresponds to one of the first two possible bit pairs of two identical bits and the other value of a bit of the first pulse train corresponds to a certain bit pair of the two possible bit pairs with two unequal bits, the two bit pairs of identical bits alternating on the transmission path and wherein means are provided in the receiver for forming bit pairs of each two successive bits of the received second pulse train and for the restoration of each pair into the corresponding bit of the first pulse train and wherein means are provided to initiate a change of pairing on reception of the other of the two possible bit pairs with unequal bits, which was not produced by conversion in the transmitter.

The means which are provided for initiating a change of pairing may be arranged to become operative only after reception of a certain number of the aforementioned bit pairs within a given number of successive bits.

A further embodiment of the invention enables additional service signals to be transmitted at any desired position of the given first pulse train, but with downwardly limited spacing between said signals and without interfering with the synchronism between the second transmitted pulse train and the first given pulse train as would be the case with the insertion of a character. To this end said means in the transmitter convert, at the appropriate position of the pulse train, three successive bits of the first pulse train into three successive bit pairs of the second pulse train, one of said bit pairs being the other said bit pair with unequal bits and whose other two bit pairs together and in definitive manner are associated with the combination of the three said bits of the first pulse train and wherein said means in the receiver respond to the other said bit pairs and restore the two other bit pairs into the corresponding three bits of the first pulse train, the service signals being so spaced that the pair changing means do not respond.

The aforementioned other bit pair with unequal bits could be regarded as an indication of wrong pairing. In such an event it will occur at least in each third bit pair. If the means for pair changing are arranged to respond only at such frequency, said bit pair at a lower frequency may be regarded as indicating a service signal group.

The service signals may for example serve as synchronization signals for the frame synchronization in a multiplex system. They may however also serve for the transmission of messages or control instructions which are characterized by two or more service signals at certain spacings. Said spacings are appropriately defined in terms of time elements of the transmitted signal and are counted by a counter.

Figure 5:
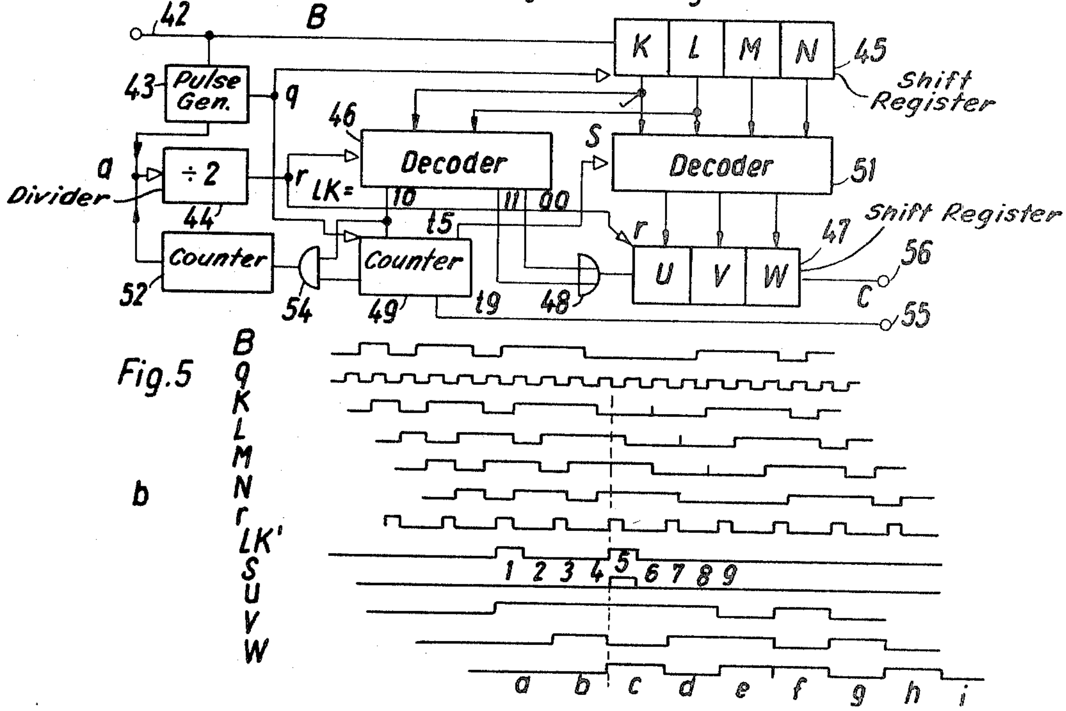

Two examples for performing the invention are explained hereinbelow by reference to the illustrations in which FIG. 1 is a circuit for converting the first pulse train into a second pulse train of B-code, FIG. 2 shows a circuit for restoring the second pulse train into the first pulse train FIG. 3 shows tables for code conversion FIG. 4 shows a circuit for converting the first pulse train into a second pulse train of B-code with means for transmitting service signals, FIG. 5 shows a circuit for restoring the second pulse train, transmitted by the circuit of FIG. 4, into the first pulse train or into a service signal.

IN FIGS. 1, 2, 4 and 5, the circuit is indicated under *a*, while the associated pulse train is shown under *b*.

The circuit of FIG. 1 serves to convert a first pulse train C, supplied to the input 1 in a binary code, into a second pulse train of the B-code which may be taken off at the output designated with the letter B. Conversion takes place as specified in FIG. 3*a*. In each case, one bit of the binary code is converted into a bit pair of the B-code. Since the binary bit 1 is alternately converted into 0 0 and 1 1, the circuit must be provided with a memory in which information is stored as to which of the two bit pairs is the appropriate one. In FIG. 1 this memory is the bistable multivibrator 9. When said multivibrator is set to 1, that is to say if the state of the line $J=1$, the next character will be 1 1; when it is set to 0, it will be 0 0. A synchronizing transmitter 2 supplies a square-wave voltage to the line designated with the numeral 3, the period of said voltage being equal to a time element of the first pulse train. The designations of the curves in FIG. 1 *b* correspond with the designations on the lines of FIG. 1*a* on which these pulse trains occur.

In FIG. 1*a*, the numerals 4 and 5 refer to AND-gates, the numeral 6 refers to an inverter, the numeral 7 refers to an AND-gate, the numeral 8 refers to an OR-gate; the numeral 9 refers to a bistable multivibrator with a balanced input. The bistable multivibrator changes its state when its input changes from 1 to 0. This is the case at the end of each binary 1 element on line 1. According to the specifications for the conversion of the first binary pulse train into the B-code in FIG. 3*a*, each bit of the binary code is converted into a bit pair of the B-code, whose bit frequency is therefore twice as high as that of the first pulse train. For the duration of the first bit of a bit pair of the B-code the timing voltage $p=0$ while during the second bit it is equal to 1.

If $C=1$ and $J=1$, the output B for the duration of the two bits of a bit pair will be at the state 1; if $C=0$, *e* will be in this state during the second bit of a bit pair. The equation expressing B in Boolean algebra will therefore be $B=C{\cdot}J+C'p$. The circuit corresponding to this equation comprises the AND-gates 5 and 7, the inverter 6, and the OR-gate 8.

In FIG. 1*b* the first line indicates the first binary pulse train C, the second line indicates the timing pulses *p*, the third line the function C*p*, which occurs at the output of the AND-gate 4, the fourth line indicates the voltage which occurs at the output J of the bistable multivibrator and which varies when the voltage at the input of the bistable multivibrator changes from 1 to 0, the fourth line indicating the pulse train obtained from the output B. With a different initial state of the bistable multivibrator 9 the voltage characteristic which occurs on the line J will be as indicated in line $J^{115}$ while the pulse train at the output B will be as indicated in line $B^{115}$. B and $B^{115}$ differ in that the bit pairs 1 1 and 0 0 are interchanged.

It should be noted that for the purpose of simultaneous transmission of a plurality of texts, multiplexing must be performed in the A-code, followed by conversion from the A-code into the B-code. The conditions of this code, which are important for transmission, would be infringed if multiplexing were to be performed in the B-code.

The circuit illustrated in FIG. 2 is contained in the receiver and serves to restore the pulses, arriving in the B-code, to the original binary code. To this end, bit pairs must be formed from each two incoming bits of the B-code. If said pairing is wrongly performed by two bits being combined which belong to different pairs, the combination 1 0, not supplied by the transmitter, will appear in at least each third bit pair. The receiver therefore recognizes that pairing is wrong and initiates a correction either immediately or after receiving several bit pairs 1 0.

In FIG. 2, the signals arrive on the line 12. A timing signal *q* whose period is equal to the element time of the received second pulse train is formed from said signals in known manner in the synchronizing signal generator 13.

If *q* changes to 1, the state of the line B is transmitted to the first stage D of a two-stage shift register 15 and at the same time the state of the stage D is transmitted to the second stage E.

A second timing pulse *r* of half the stepping frequency is produced in a divider-by-two 14 and drops into gaps of the timing pulse *q* The states of the shift register 15 are transmitted to a decoder 16. For each timing pulse *r*, a pulse will appear at one of the four outputs of the decoder which is determined by the position of the shift register 15. When E=0, D=1 this pulse will appear at the output designated with 0 1 and sets a bistable multivibrator 17 to position 0. If *D*=*E*, pulse will appear either at the output 0 0 or at the output 1 1 to set the bistable multivibrator 17 to 1 via the OR-gate 18. A voltage characteristic, equal to the input signal C of the circuit illustrated in FIG. 1, will appear at the output C of the bistable multivibrator 17.

However, if at the time at which the pulse *r* occurs there is also a pulse on the output, designated 1 0 of the decoder 16, this is an indication that pairing is incorrect, in other words that the pulse *r* is not correctly timed relative to the incoming pulse train. Accordingly, the pulse which appears at the output 1 0 of the decoder 16 is transferred via a delay circuit 19 adapted to produce a pulse which does not coincide with the timing pulse *q* and which is transferred to the counter input of the divider-by-two 14.

Said pulse indexes the aforementioned divider-by-two by one step so that position of the pulse *r* is changed relative to the incoming pulse train. Since there are only two possibilities of pairing, the latter must then be the correct position.

To prevent pairing being shifted by a single interference pulse, it is possible to insert, in place of the delay circuit 19, a counter which delivers an output pulse only if a certain number of pulses occur at its input during a certain time.

In FIG. 2*b*, the first curve shows the characteristic of the receiver input voltage occurring at point 12, the second line indicates the timing pulse *q*, the third and fourth lines indicate the states of the two stages of the shift register 15, the fifth line refers to the timing pulse *r* and the sixth line refers to the output voltage C.

To transmit a service signal, three successive bit groups of the signal are replaced by other bit groups.

The manner in which the groups of three in the A-code are associated with the three bits of the first pulse train is indicated in FIG. 3*b*. The first bit group A1 A2 in A-code is always 1 0, the two others contain all possible combinations of the bit pairs 0 0, 0 1, 1 0, with the exception of the combination which contains twice 1 0. In all other respects the characters of the A-code are in arbitrary association with those of the binary code.

FIG. 4*a* shows a circuit for converting a first binary pulse train, arriving on the line 21, into a pulse train according to the B-code which is delivered to line 22. Furthermore, the circuit contains means for the transmission of service signals at any desired position by formation of the group of three bit pairs described hereinabove. The circuit comprises two parts, namely a first part for the conversion of three bits of the binary pulse train into a group of three bit pairs of the A-code according to FIG. 3*b* and of a second part 23 for the conversion of the pulse train according to the A-code into a pulse train according to the B-code. An example of such a conversion circuit is disclosed in the cited article by Neu.

In the first part of the circuit a synchronizer 24 produces a square-wave voltage *p* whose cycle length is equal to the length of one element of the first binary pulse train. When this voltage changes from 1 to 0, the state of the line 21 is transferred to the first stage F of a shift register 25 while at the same time the state of F is transmitted to the stage G and the state of the stage G is transmitted to the stage H.

The state of the stage G is transmitted via the NOR-gate 26 (OR-gate with inverter at the output) and via the OR-gate 27 to a second output 28 of the A/B converter 23. In addition to the input of G, the NOR-gate 26 has a further input Q, obtained from the bistable multivibrator 30. During normal character transmission said bistable multivibrator is in the 0 state so that Q is equal to 0 and therefore has no effect on the NOR-gate 26. The aforementioned two bits, being associated with one bit pair of the A-code, occur simultaneously at the input of the A/B converter 23, namely, the first bit A1 on the line 29, the second bit A2 on the line 28 while the two bits of the bit pairs of the B-code appear successively on the output line 22. The instructions specified in FIG. 3*a* for converting the first binary pulse train C into the pulse train of the A-code indicates that the first A1 bit is always equal to 0 while the second bit A2 is equal to G′, the inverted and delayed input bit.

The connection from the output of the second stage G of the shift register 25 via the NOR-gate 26 and the OR-gate 27 performs this function. The input 29 for the first bit of the bit pair of the A-code is always at 0, in accordance with the conversion instruction of FIG. 3*a*, in the same way as the line 37.

To transmit a service signal a pulse is applied to the input 31 of the bistable multivibrator 30, said pulse occurring at the same time at which the shift register 25 is indexed. Accordingly, the output Q of the bistable multivibrator 30 is set to 1 and 0 appears at the output of the NOR-gate 26 for as long as the bistable multivibrator 30 is set to 1. The state 1 on the line Q renders the AND-gate 38 conductive so that the *p*-pulses index the counter 32 successively beginning from position 0. During the times *t* 1, *t* 2 and *t* 3, each of which have the duration of the first impulse train, the line with the corresponding designation will be set to 1.

At the beginning of the time *t* 2 the states of the three stages F, G, H of the shift register 25 are transmitted via the AND-gate 34 to the three bistable multivibrators R, S, T of the register 35. These states are specially marked by being framed. The three counter outputs *t*1, *t*2 and *t*3 as well as the outputs of the bistable multivibrators R, S and T are connected to the inputs of a code converter 36. During the time *t*1 a 1 will appear at the output 29 of said code converter while a 0 will appear at its output 37. These form the bit pair 1 0 of the group of three. During the time *t*2 the two bits K, L of the second bit pair of the group of three appear at the outputs of the code converter depending on the position of the bistable multivibrators R, S and T in accordance with the conversion instructions shown in FIG. 3*b*. The two bits M, N of the third bit pair appear in the same way during the time $t3$. After the time $t3$ has elapsed the counter moves to position $t0$ and supplies the line 33 with a pulse which resets the bistable multivibrator 30 to 0. This pulse is very short which is indicated by a capacitor 38 connected in the line 33, so that the bistable multivibrator is not prevented from being reset to 1 by the next pulse which appears on the line 31. The 0 position of the bistable multivibrator 30 causes Q to be set to 0 and transmission to the A/B converter 23 once again takes place from the stage G of the shift register via the NOR-gate 26 and the OR 27 while no further signals are obtained from the code converter 36.

As already mentioned by reference to FIG. 1, any possible time multiplexing must be performed upstream of the code converter 23 so that said code converter is then common to all paths of the multiplex system.

In FIG. 4*b* the first line shows a first binary pulse train C to be transmitted (the same as in FIGS. 1 and 2) having the bits *a–i*. Of these, the bits *a*, *b*, *f–i* are converted in accordance with the instructions shown in FIG. 3*a*, the bits *c*, *d*, *e* being used for transmitting a service signal and being converted in accordance with FIG. 3*b*.

The second line shows the timing pulse *p*, the third to fifth lines show the states of the stages F, G, H of the shift register 25.

At the beginning of the pulse *d* the bistable multivibrator 30 is set to 1; the line designated with Q indicates the voltage at its output. The next lines indicate the states of the outputs $t1$, $t2$ and $t3$ of the counter 32. During the period $t2$ the states of the stages F, G, H of the shift register 25 are transmitted to the bistable multivibrators of the register 35 which is specially marked in the third to fifth line by framing. The characters stored at that moment of time are *e*, *d*, *c* (1, 0, 1). Only the output voltage characteristic of the bistable multivibrator R is shown as an example of all the possible states of the bistable multivibrator 35. The characters *x*, *y*, *z* are obtained in the code converter, namely 1 0 0 0, 1 0. The two bits of a bit pair appear simultaneously on the lines 29 and 37 for the duration of a full time element of the first pulse train and are converted by the A/B code converter 23 into the B-code shown on the last line. FIG. 5 *a* shows a receiver for a second pulse train with service signals in the B-code as transmitted by the transmitter according to FIG. 4*a*. FIG. 5*b* shows the pulse system associated with FIG. 5*a*. Demultiplexing must be performed upstream of the input indicated in FIG. 5*a* if multiplex transmission is to be performed.

The circuit contains a synchronizer 43, synchronized by the pulse train which arrives on line 43, a divider-by-two 44, a four-stage shift register 45 having the stages K, L, M and N and a decoder 46. These parts correspond to parts of FIG. 2*a*, namely the synchronizer 43 corresponding to the synchronizer 13, the divider-by-two 44 corresponding to the divider-by-two 14, the stages K and L of the shift register 45 corresponding to the stages D and E of the shift register 15, the decoder 46 corresponding to the decoder 16, the first stage U of the shift register 46 corresponding to the bistable multivibrator 17 and the OR-gate 48 corresponding to the OR-gate 18. The stage U forms the first stage of a shift register 47 which is regularly indexed by the pulses *r* having the pulse frequency of the first pulse train, so that the bit fed into the stage U appears two cycles later at the output 56.

The pulses *q* of the synchronizer 43 continue to index the shift register 45 while the pulse *r* of the divider-by-two continue to index the shift register 47. Said shift register has no connection to the decoder 46 for the purpose of feeding in a 0 since this is transmitted automatically by the pulse *r* into the first stage R of the shift register 47 if no 1 appears at the output of the OR-gate 48. The method of operation of the parts hereinbefore described is the same as that of the parts of FIG. 2*a*, thus making it possible to dispense with a repetition. The delay member of counter 19 corresponds to a counter 49 whose function will be described subsequently.

In addition to the parts of FIG. 2*a*, the circuit of FIG. 5*a* contains two stages M and N of the shift register 45, two stages V and W of the shift register 47, a counter 52 and a decoder 51.

If a pulse appears at the output 1 0 of the decoder 46 at the time of a *r* pulse, the counter 49 will be set to position 1 and will be indexed by one step from this position by each impulse *q*. While said counter is at position 5 its output $t5$ will transmit a pulse *s* to the decoder 51 which is connected to the four stages of the shift register 45 and performs code conversion in accordance with table 3*b*. The signals which will then appear at the output of the decoders set the three stages of the shift register 47 to the corresponding states without reference to the state in which they were previously. Accordingly, the inserted characters *x*, *y* and *z* are replaced by the characters *c*, *d*, *e* of the first pulse train, these being transmitted successively to the output 56.

The counter 49 continues to count to the position 9 whereupon it returns into its static position. During the times $t2$ to $t9$ said counter renders the gate 54 conductive so that said gate transmits, during the aforementioned time, the pulses appearing at the output 10 of the decoder 46 to the counter 52. If more than one pulse occurs during this period, it means that pairing was wrongly performed, the counter 52 will then transmit a pulse to the divider-by-two, which resets the counter and thus corrects pairing. During the operating period of the counter $t9$ the service signal output 55 is set to 1. Said service signal is utilized by means not shown, for example by a synchronizing circuit or by means of a communications receiver.

In the event of wrong pairing the counter 49 is reset to 0 at the beginning of the ninth step, so that no signal appears at the service signal output 55 and no service signal is simulated by the bit pair 1 0 produced as the result of wrong pairing. To prevent any further service signal coinciding with the conductive period of the gate 54, the service signals must be spaced from each other by an amount being equal to at least 10 steps of the first pulse train.

In FIG. 5*b*, B refers to the received pulse train and *q r* refer to the voltages which appear at the output of the synchronizer 43 or the divider-by-two 44, while K, L, M, N refer to the states of the stages of the shift register 45.

When the decoder is scanned by *r*, a state 1 will appear at the drawn position on the output 1 0 in accordance with the combination L, K′; the counter 49 counts, as indicated by the numbers in the following line, and on reaching position 5 delivers a pulse *s* which reads the shift register 45 via the decoder 51. At this moment of time, the shift register states N M L K = 1 1 1 0. This combination is converted by the code converter into 1 0 1 and transmitted to the stages U, V, W of the shift register. The states thereof are plotted in the last three lines of FIG. 5*b*. The state of stage W corresponds to the pulse train C at the output 56. A pulse of time $t9$ of the counter 49 appears at the output 55.

The expert skilled in the art will be able to employ diverse modifications of the illustrated circuits without however departing from the basic idea of the invention.

We claim:

1. A system for the transmission of a first synchronous binary pulse train (C), comprising a transmitter (FIG. 1*a*), means in said transmitter for converting each bit of said first binary pulse train (C) into a pair of successive bits of a second pulse train (B) so that the bits of said first binary pulse train which have a first value (e.g. "1") correspond each to a pair ("0 0,""1 1") of equal bits having alternately said first and second bit value, and the bits of said first binary pulse train (C) which have the second value ("0") correspond each to a predetermined one (e.g."01""01," "10") of unequal bits, a receiver (FIG. 2*a*), a transmission line (12) for transmission of said second pulse train (B) from said transmitter (FIG. 1) to said receiver (FIG. 2) and having a band pass characteristic, means (14, 16) in said receiver for dividing the received second pulse train (B) into pairs of successive bits, and means (14, 16, 19) for shifting the separation between two of these pairs of successive bits along one bit when at least one of these pairs of successive bits consists of the other (e.g. "1 0") of said two possible pairs of unequal bits, and means for converting (16, 18, 17) the pairs of bits into a pulse train corresponding to said first synchronous binary pulse train (C) by converting each pair ("0 0," "1 1") of equal bits to a bit having said first valve (e.g. "1") and each pair of unequal bits (e.g. "0 1") to a bit having the second value (e.g. "0").

2. A system for the transmission of a first synchronous binary pulse train (C) and of additional service signals (Q) consisting each of one bit and spaced from each other by at least a predetermined number of bits of said first binary pulse train, comprising a transmitter (FIG. 4_a_) having an input (21) for said first binary pulse train (C) and a further input (31) for said service signals (Q), means (25, 26, 27, 23) in said transmitter for converting, if no service signal (Q) occurs, the bits of said first binary pulse train (C) each into a pair of successive bits of a second pulse train (B in FIG. 4_b_) so that the bits of said first binary pulse train which have a first value (e.g. "1") correspond each to a pair of equal bits ("1 1," "0 0"), these pairs consisting alternately of bits of said first and second bit value, and the bits of said first binary pulse train which have the second value (e.g. "0") correspond each to a predetermined one e.g. "0 1") of the two possible pairs of unequal bits, and means (30, 38, 32, 25, 34, 35,) for converting, if a service signal occurs, three successive bits of said first binary pulse train into a group of three successive bit pairs of the second pulse train, one of these bit pairs of the second pulse train being the other (e.g. "1 0") of the two possible pairs of unequal bits and the remaining four bits of these three successive bit pairs being a bit combination assigned to the combination of said three successive bits of the first binary pulse train, a receiver (FIG. 5_a_) having an output (56) for a reproduction of the first binary pulse train (W, FIG. 5_b_) and a further output (55) for a reproduction of the service signals, a transmission line (22–42) for transmission of said second pulse train from said transmitter to said receiver and having a band pass characteristic, means (44,46) in said receiver for obtaining pairs of bits of the received second pulse train by dividing the received second pulse train into pairs of successive bits, and means (44,46,52) for shifting the pair forming separation along one bit, when two of the other (e.g. "1 0") of said possible pairs of unequal bits are spaced by a number of bit pairs smaller than said predetermined number of bits, means in said receiver connected to convert (46, 48, 47) the obtained pairs of bits into said reproduction of the first synchronous binary pulse train, if no other of the two possible pairs of unequal bits occurs, by converting each pair of equal bits to a bit having said first value (e.g. "1") and each pair of unequal bits to a bit having the second value (e.g. "0") and means (46, 49, 51) in said receiver connected to respond to said other (e.g. "1 0") of the two possible combinations of unequal bits and convert the combinations of four bits to the combinations of three successive bits assigned thereto and deliver a reproduction of the service signal on said further output (55).

3. A system as set forth in claim 2, in which said means for shifting (52, FIG. 5) in said receiver becomes operative during reception of a given number of bits of said second pulse train, when a certain number of pairs of successive bits consists each of the other (e.g. "1 0") of said possible pairs of unequal bits.

* * * * *